US012725270B2

(12) United States Patent
Zhu et al.

(10) Patent No.: US 12,725,270 B2
(45) Date of Patent: Sep. 1, 2026

(54) IMAGE SEGMENTATION BY OBTAINING A PRE-PROCESSED HUE HISTOGRAM

(71) Applicant: Suzhou Cleva Precision Machinery & Technology Co., Ltd., Suzhou (CN)

(72) Inventors: Shaoming Zhu, Suzhou (CN); Xue Ren, Suzhou (CN)

(73) Assignee: Suzhou Cleva Precision Machinery & Technology Co., Ltd., Suzhou (CN)

( * ) Notice: Subject to any disclaimer, the term of this patent is extended or adjusted under 35 U.S.C. 154(b) by 547 days.

(21) Appl. No.: 18/315,131

(22) Filed: May 10, 2023

(65) Prior Publication Data

US 2023/0368394 A1 Nov. 16, 2023

(30) Foreign Application Priority Data

May 12, 2022 (CN) ......................... 202210512135.0

(51) Int. Cl.

| | |
|---|---|
| ***G06T 7/136*** | (2017.01) |
| ***G06T 5/20*** | (2006.01) |
| ***G06T 5/40*** | (2006.01) |
| ***G06T 5/70*** | (2024.01) |
| ***G06T 7/11*** | (2017.01) |

(52) U.S. Cl.

CPC ................ *G06T 7/136* (2017.01); *G06T 5/20* (2013.01); *G06T 5/40* (2013.01); *G06T 5/70* (2024.01); *G06T 7/11* (2017.01); *G06T 2207/10024* (2013.01)

(58) Field of Classification Search

CPC .. G06T 7/136; G06T 5/20; G06T 5/40; G06T 5/70; G06T 7/11; G06T 2207/10024; G06T 7/90; G06T 2207/20024

See application file for complete search history.

(56) References Cited

U.S. PATENT DOCUMENTS

| | | | | |
|---|---|---|---|---|
| 2010/0177234 A1* | 7/2010 | Ogura | G06T 7/194 348/333.03 |
| 2010/0202684 A1* | 8/2010 | Mattausch | G06T 7/11 382/164 |

FOREIGN PATENT DOCUMENTS

| | | |
|---|---|---|
| CN | 109584258 | 10/2021 |
| EP | 4276755 | 12/2025 |

OTHER PUBLICATIONS

Oppenheim Dor, et al. "Detecting Tomato Flowers in Greenhouses Using Computer Vision", International Journal of Computer and Information Engineering, vol. 11, No. 1, Jan. 1, 2017.

(Continued)

*Primary Examiner* — Christopher Wait

(74) *Attorney, Agent, or Firm* — JK Intellectual Property Law, PA

(57) ABSTRACT

An image segmentation method includes the steps of: obtaining a hue histogram corresponding to a hue channel image based on an original image; determining a target parameter value based on the hue histogram; determining a saturation segmentation threshold as a first threshold range if the target parameter value satisfies a preset condition, otherwise determining the saturation segmentation threshold as a second threshold range, where a minimum value of the first threshold range is greater than a minimum value of the second threshold range; and performing image segmentation in combination with the first threshold range or the second threshold range as determined in the previous step. Related apparatus, computer devices, and computer readable storage media are also disclosed.

7 Claims, 5 Drawing Sheets

(56) References Cited

OTHER PUBLICATIONS

Ruiz-Ruiz, et al., "Testing different color spaces based on hue for the environmentally adaptive segmentation algorithm", Computers and Electronics in Agriculture, Elsevier, Amsterdam, NL, vol. 68, No. 1, Aug. 1, 2009.

Ren Honge, et al. "Object recognition algorithm research based on variable illumination", Automation and Logistics, 2009, ICAL '09, IEEE International Conference on IEEE, Piscataway, NJ, USA Aug. 5, 2009, pp. 1609-1613.

European Search Report and Written Opinion for EP Application No. EP23173140, dated Aug. 13, 2023.

Response to Written Opinion for EP Application No., EP23173140.7, dated Apr. 3, 2024.

* cited by examiner

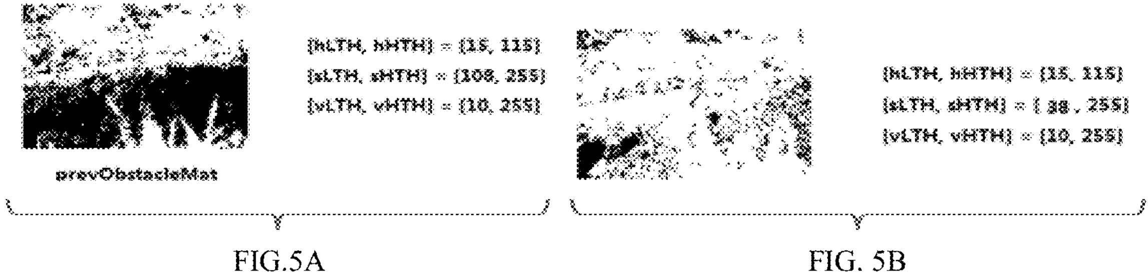
FIG.5A
FIG. 5B
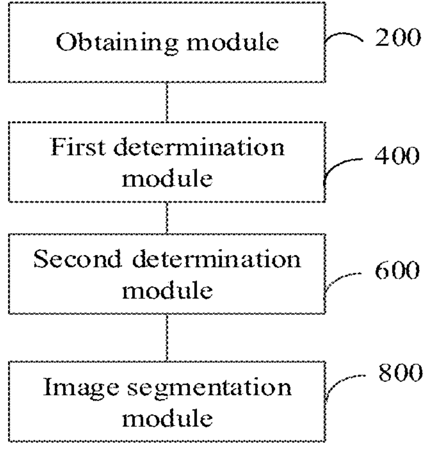
FIG. 6

IMAGE SEGMENTATION BY OBTAINING A PRE-PROCESSED HUE HISTOGRAM

CROSS-REFERENCE TO RELATED PATENT APPLICATIONS

This application claims benefit of Chinese Application No. 202210512135.0, filed on May 12, 2022, which is incorporated by reference herein.

TECHNICAL FIELD

The present application relates to the field of image processing technology, in particular to an image segmentation method and apparatus, a computer device, and a readable storage medium.

BACKGROUND

Image segmentation technology is one of key technologies in the fields of image processing and computer vision recognition, and determines the quality of digital image analysis and the quality of visual information processing results.

An intelligent lawn mower used as an example captures image information of the ground in real time during travel, and then segments captured images to obtain lawn regions and non-lawn regions (such as cement ground), so as to clean the lawn regions. However, when the setting sun shines on the ground, ground images captured in the setting sun are often yellowish compared to ground images in normal light. If conventional image segmentation methods are used, segmentation effects may be unclear and inaccurate, resulting in misjudgment on lawn regions and non-lawn regions.

Therefore, how to clearly and accurately segment an image captured in the setting sun is one of urgent problems to be solved in the art.

SUMMARY

Based on this, it is necessary to provide an image segmentation method, an image segmentation apparatus, a computer device, and a computer-readable storage medium in response to the above problems.

According to a first aspect of embodiments of the present application, an image segmentation method is provided, including:

- obtaining a hue histogram corresponding to a hue channel image based on an original image;
- determining a target parameter value based on the hue histogram;
- determining a saturation segmentation threshold as a first threshold range if the target parameter value satisfies a preset condition, otherwise determining the saturation segmentation threshold as a second threshold range, where a minimum value of the first threshold range is greater than a minimum value of the second threshold range; and
- performing image segmentation in combination with the first threshold range or the second threshold range.

In one embodiment, the step of obtaining a hue histogram corresponding to a hue channel image based on an original image includes:

- converting the original image into an HSV image; and
- separating the HSV image to obtain the hue channel image and the corresponding hue histogram.

In one embodiment, after the step of obtaining a hue histogram corresponding to a hue channel image based on an original image, the image segmentation method further includes:

- pre-processing the hue histogram, where the pre-processing includes filtering and smoothing.

In one embodiment, the target parameter value includes at least one of a peak pixel quantity, a hue value corresponding to the peak pixel quantity, a pixel quantity corresponding to zero hue, and a rightmost valid hue value on the horizontal axis.

In one embodiment, the preset condition includes any of the following:

- Condition A: the peak pixel quantity is greater than a first peak, the hue value corresponding to the peak pixel quantity is less than a first hue value, the rightmost valid hue value on the horizontal axis is less than a second hue value, and the pixel quantity corresponding to zero hue is greater than a preset pixel quantity; and
- Condition B: the peak pixel quantity is greater than a second peak, the second peak is greater than the first peak, the hue value corresponding to the peak pixel quantity is less than the first hue value, and the rightmost valid hue value on the horizontal axis is less than the second hue value.

In one embodiment, the first peak is 1000, the second peak is 3000, the first hue value is 25°, the second hue value is 45°, and the preset pixel quantity is 100.

In one embodiment, the first threshold range is 108-255, and the second threshold range is 38-255.

In one embodiment, the performing image segmentation in combination with the first threshold range or the second threshold range includes:

- segmenting lawn regions and non-lawn regions out from the HSV image in combination with the first threshold range or the second threshold range.

According to a second aspect of the embodiments of the present application, an image segmentation apparatus is provided, including:

- an obtaining module, configured to obtain a hue histogram corresponding to a hue channel image based on an original image;
- a first determination module, configured to determine a target parameter value based on the hue histogram;
- a second determination module, configured to determine a saturation segmentation threshold as a first threshold range if the target parameter value satisfies a preset condition, otherwise determine the saturation segmentation threshold as a second threshold range, where a minimum value of the first threshold range is greater than a minimum value of the second threshold range; and
- an image segmentation module, configured to perform image segmentation in combination with the first threshold range or the second threshold range.

According to a third aspect of the embodiments of the present application, a computer device is provided, including a memory and a processor. The memory stores a computer program, and the processor implements the foregoing image segmentation method when executing the computer program.

According to a fourth aspect of the embodiments of the present application, a computer-readable storage medium is provided, storing a computer program. The foregoing image segmentation method is implemented when the computer program is executed by a processor.

According to the image segmentation method and apparatus, the computer device, and the computer-readable storage medium provided in the embodiments of the present application, a hue histogram corresponding to a hue channel is obtained based on an original image, a target parameter value may be determined based on the hue histogram, then whether the target parameter value satisfies a preset condition is determined, and a saturation segmentation threshold is determined as a first threshold range if the target parameter value satisfies the preset condition, or the saturation segmentation threshold is determined as a second threshold range if the target parameter value does not satisfy the preset condition, where a minimum value of the first threshold range is greater than a minimum value of the second threshold range; and finally, image segmentation is performed in combination with the first threshold range or the second threshold range.

That is, captured images are not segmented by using a fixed saturation threshold range, but different saturation segmentation thresholds are used for different images to improve the clarity and accuracy of segmentation. Specifically, the preset condition and the saturation segmentation threshold may be set according to actual scenarios. For example, the preset condition and the saturation segmentation threshold may be set in advance according to the yellowing characteristics of images captured in the setting sun, and then whether the current image satisfies the preset condition is determined. If the current image satisfies the preset condition, it indicates that the current image is a yellowing image captured in the setting sun, and the first threshold range that matches the current image is used as the saturation segmentation threshold to segment the image. The minimum value of the first threshold range is greater than the minimum value of the second threshold range to adapt to the characteristic of high saturation of lawn regions in the setting sun. Consequently, the image can be clearly and accurately segmented for lawn and non-lawn, poor segmenting effects caused by image yellowing are avoided, and subsequent misjudgment is reduced.

BRIEF DESCRIPTION OF THE DRAWINGS

FIGS. 5A and 5B show a comparison of image segmentation results with different saturation segmentation thresholds in a specific example;

FIG. 6 is a schematic structural diagram of an image segmentation apparatus provided in an embodiment of the present application.

DETAILED DESCRIPTION

Figure 1:
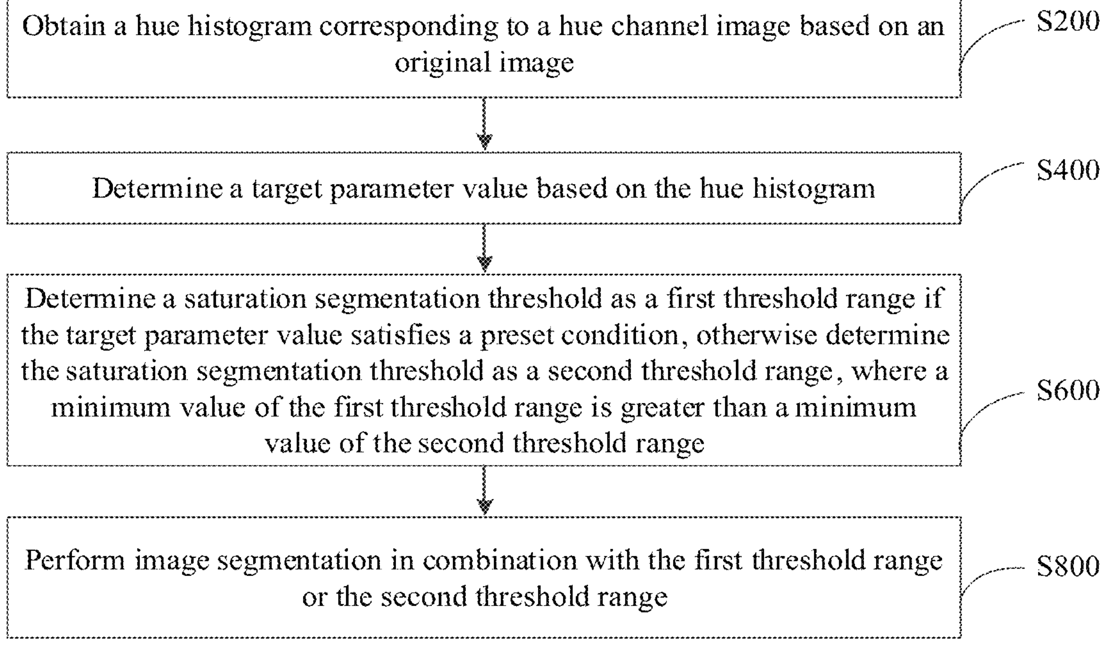
FIG. 1 is a block flowchart of an image segmentation method provided in an embodiment of the present application.

In order to facilitate the understanding of the present application, the present application will be described more comprehensively below with reference to the relevant accompanying drawings. Preferred embodiments of the present application are shown in the drawings. However, the present application may be implemented in many different forms, and is not limited to the embodiments described herein. On the contrary, these embodiments are provided for a more thorough and comprehensive understanding of the disclosure of the present application.

In the present application, unless otherwise specified and defined, the terms "mounted", "connected", "connection", "fixed", and the like should be understood broadly. For example, the "connection" may be a fixed connection, a detachable connection, or an integrated connection, may be a mechanical connection or an electrical connection, may be a direct connection or an indirect connection by means of an intermediate medium, or may be an internal connection of two elements or an interaction between two elements. Those of ordinary skill in the art may understand the specific meanings of the above terms in the present application according to specific circumstances.

The terms "first" and "second" are used merely for descriptive purposes, and cannot be understood as indicating or implying relative importance or implicitly indicating a quantity of indicated technical features. Therefore, a feature defined by "first" or "second" may explicitly or implicitly include at least one such feature. In the description of the present application, the meaning of "plurality" is at least two, for example two or three, unless otherwise specifically defined.

Unless otherwise defined, all technological and scientific terms used herein have the same meanings as commonly understood by those of ordinary skill in the technical field of the present application. The terms used in the description of the present application are only for the purpose of describing specific embodiments, but are not intended to limit the present application. The term "and/or" used herein includes any and all combinations of one or more relevant listed items.

As mentioned in the background, image segmentation technology is one of key technologies in the fields of image processing and computer vision recognition, and has been widely used in various intelligent devices. An intelligent lawn mower used as an example may capture image information of the ground in real time during travel and segment the same, where the segmentation is mainly for lawn regions and non-lawn regions such as cement ground, so as to clean the lawn regions. Therefore, accuracy of segmenting lawn regions and non-lawn regions directly affects working performance of the intelligent lawn mower.

At present, lawn regions and non-lawn regions are generally segmented by using fixed segmentation thresholds. However, features of images obtained in different light scenarios are different. For example, images captured in the setting sun are often yellowish compared to images captured in normal light. If the images captured in the setting sun are segmented with a segmentation threshold suitable for the images in the normal light, segmentation effects are unclear and inaccurate, and misjudgment on lawn regions and non-lawn regions easily occurs to affect efficient work of the intelligent lawn mower.

Accordingly, embodiments of the present application provides an image segmentation method, an image segmentation apparatus, a computer device, and a computer-readable storage medium to clearly and accurately segment images captured in the setting sun, so as to reduce misjudgment on lawn regions and non-lawn regions.

In one embodiment, an image segmentation method is provided. The image segmentation method may be used to segment lawn regions and non-lawn regions according to captured images.

With reference to FIG. 1, the image segmentation method provided in this embodiment includes the following steps:

Step S200: Obtain a hue histogram corresponding to a hue channel image based on an original image.

Images are captured through a capture device. When an image is captured, the captured image is obtained from the capture device. In the embodiment of the present application, the image is defined as the original image, which may include lawn regions and non-lawn regions. The image has multiple characteristics, such as saturation, hue, and value. Each characteristic has an image of a corresponding channel. In this embodiment, the original image may be processed correspondingly to obtain the hue channel image, and the hue histogram may be generated according to the hue channel image for subsequent processing.

Step S400: Determine a target parameter value based on the hue histogram.

Generally, a horizontal axis of the hue histogram represents hue values, and a vertical axis represents quantities of pixel points, abbreviated as pixel quantities. A hue distribution range in the current image and a pixel quantity contained in a hue of any point may be determined from the hue histogram. In this embodiment, the target parameter value may be determined based on the hue histogram, where the target parameter value is a value of a parameter for determining whether the image turns yellow under the influence of the setting sun, for example, a peak pixel quantity in the hue histogram, a hue value corresponding to the peak pixel quantity, a pixel quantity corresponding to a hue of 0, or a last valid hue value in the horizontal axis. If the image turns yellow under the influence of the setting sun, the value of the target parameter is generally different from that of the target parameter corresponding to a normal image, where the normal image does not turn yellow under the influence of the setting sun. Based on this, in this embodiment, the target parameter value of the current image may be determined first, so as to infer, through the target parameter value, whether the current image turns yellow under the influence of the setting sun.

Step S600: Determine a saturation segmentation threshold as a first threshold range if the target parameter value satisfies a preset condition, otherwise determine the saturation segmentation threshold as a second threshold range, where a minimum value of the first threshold range is greater than a minimum value of the second threshold range.

In the case where the image turns yellow under the influence of the setting sun, the value of the target parameter in the corresponding hue histogram has a corresponding pattern. In this embodiment, the preset condition may be set in advance according to the corresponding pattern. When the target parameter value corresponding to the current image is determined, the current target parameter value is compared with the preset condition to determine whether the target parameter value satisfies the preset condition. If the target parameter value satisfies the preset condition, it may be inferred that the current image turns yellow under the influence of the setting sun. If the target parameter value does not satisfy the preset condition, it may be inferred that the current image does not turn yellow under the influence of the setting sun. The preset condition may be that the peak pixel quantity in the hue histogram is greater than a value, the hue value corresponding to the peak pixel quantity is less than a value, or the like. The specific preset condition may be set according to an actual situation, as long as the preset condition satisfies the feature of the image that turns yellow under the influence of the setting sun.

If the image that turns yellow under the influence of the setting sun is segmented with a segmentation threshold for a normal image, the segmentation effect is unclear and inaccurate, and misjudgment on lawn regions and non-lawn regions easily occurs. In this embodiment, different saturation segmentation thresholds are preset according to different characteristics of normal images and images that turn yellow under the influence of the setting sun. When it is determined that the current image turns yellow under the influence of the setting sun, the first threshold range that matches the current image is used as the saturation segmentation threshold. When it is determined that the current image does not turn yellow under the influence of the setting sun, the second threshold range that matches the current image is used as the saturation segmentation threshold. Due to the fact that the saturation of a lawn in the image captured in the setting sun is often higher than that in a normal image, setting the minimum value of the first threshold range to be greater than the minimum value of the second threshold range can help improve the accuracy of segmentation of lawn regions and non-lawn regions from the image that turns yellow under the influence of the setting sun.

Step S800: Perform image segmentation in combination with the first threshold range or the second threshold range.

After the saturation segmentation threshold is determined, the image segmentation may be performed by combining the saturation segmentation threshold (the first threshold range or the second threshold range), a hue channel threshold, and a value channel threshold to segment lawn regions and non-lawn regions.

According to the image segmentation method provided in the embodiment of the present application, a hue histogram corresponding to a hue channel is obtained based on an original image, a target parameter value may be determined based on the hue histogram, then whether the target parameter value satisfies a preset condition is determined, and a saturation segmentation threshold is determined as a first threshold range if the target parameter value satisfies the preset condition, or the saturation segmentation threshold is determined as a second threshold range if the target parameter value does not satisfy the preset condition, where a minimum value of the first threshold range is greater than a minimum value of the second threshold range; and finally, image segmentation is performed in combination with the first threshold range or the second threshold range.

That is, captured images are not segmented by using a fixed saturation threshold range, but different saturation segmentation thresholds are used for different images to improve the clarity and accuracy of segmentation. Specifically, the preset condition and the saturation segmentation threshold may be set according to actual scenarios. For example, the preset condition and the saturation segmentation threshold may be set in advance according to the yellowing characteristics of images captured in the setting sun, and then whether the current image satisfies the preset condition is determined. If the current image satisfies the preset condition, it indicates that the current image is a yellowing image captured in the setting sun, and the first threshold range that matches the current image is used as the saturation segmentation threshold to segment the image. The minimum value of the first threshold range is greater than the minimum value of the second threshold range to adapt to the characteristic of high saturation of lawn regions in the setting sun. Consequently, the image can be clearly and accurately segmented for lawn and non-lawn, poor segmenting effects caused by image yellowing are avoided, and subsequent misjudgment is reduced.

Figure 2:
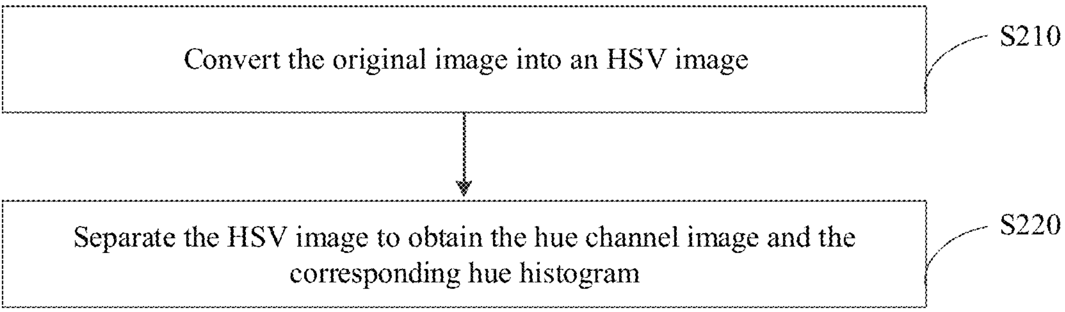
FIG. 2 is a block flowchart of step S200 in the image segmentation method provided in an embodiment of the present application.

In one embodiment, with reference to FIG. 2, step S200 of obtaining a hue histogram corresponding to a hue channel image based on an original image includes:

Step S210: Convert the original image into an HSV image.

The original image captured by a capture device such as a camera is usually in an RGB format. The image in the RGB format is first converted into an image in an HSV format (abbreviated as HSV image) for subsequent analysis. Depending on the source of the original image, its image format may differ, that is, the original image may alternatively be in another image format, but is uniformly converted to an HSV image.

The HSV format is a color space that includes hue H, saturation S, and value V. The hue H is measured by an angle, and its value range is 0°-180°; the saturation S represents a degree to which the color is close to a spectral color, a larger proportion of the spectral color indicates a higher degree to which the color is close to the spectral color and a higher saturation of the color, and a value range of the saturation S is 0%-100%; and the value V represents a degree of brightness of the color, the value V is related to the transmittance or reflectance of an object for an object color, and a value range of the value V is 0%-100%, where 0% represents black and 100% represents white.

Step S220: Separate the HSV image to obtain the hue channel image and the corresponding hue histogram.

The HSV image is separated after being obtained. As mentioned above, the HSV image includes images of three channels: hue, saturation, and value. In this embodiment, whether an image turns yellow under the influence of the setting sun needs to be determined. Therefore, only the hue channel image needs to be obtained, and the hue histogram corresponding to the hue channel image is obtained at the same time.

In one embodiment, after step S200 of obtaining a hue histogram corresponding to a hue channel image based on an original image, the image segmentation method provided in this embodiment further includes the following step:

Step S300: Pre-process the hue histogram, where the pre-processing includes filtering and smoothing.

After the hue histogram is obtained, pre-processing operations such as filtering and smoothing are first performed to reduce interference signals in the hue histogram and further reduce erroneous segmentation.

In one embodiment, the target parameter value includes at least one of a peak pixel quantity, a hue value corresponding to the peak pixel quantity, a pixel quantity corresponding to zero hue, and a rightmost valid hue value on the horizontal axis.

Figure 3:
FIG. 3 is a schematic diagram of a hue histogram obtained in the image segmentation method provided in an embodiment of the present application.

With reference to FIG. 3, the peak pixel quantity is a maximum value of the quantity of pixel points in the hue histogram (maxColor in FIG. 3), the hue value corresponding to the peak pixel quantity is a hue value corresponding to the maximum value of the quantity of pixel points in the hue histogram (maxColorH in FIG. 3), the pixel quantity corresponding to zero hue is a quantity of pixel points corresponding to zero hue in the hue histogram (hZero in FIG. 3), and the rightmost valid hue value on the horizontal axis is a hue value corresponding to a point where the first quantity of pixel points is greater than 30 in a direction from right to left on the horizontal axis (lastH in FIG. 3). In this embodiment, the target parameter value is used as a main criterion for determining whether the image turns yellow under the influence of the setting sun.

In one embodiment, the preset condition includes any of the following:

Condition A: the peak pixel quantity is greater than a first peak, the hue value corresponding to the peak pixel quantity is less than a first hue value, the rightmost valid hue value on the horizontal axis is less than a second hue value, and the pixel quantity corresponding to zero hue is greater than a preset pixel quantity; and Condition B: the peak pixel quantity is greater than a second peak, the second peak is greater than the first peak, the hue value corresponding to the peak pixel quantity is less than the first hue value, and the rightmost valid hue value on the horizontal axis is less than the second hue value.

A large number of captured images are used as the basis of data analysis, and the hue histogram of each image is analyzed to obtain distribution characteristics of the histogram, for example, many pixels with an image hue of 0 and orange yellow pixels in non-lawn regions (such as cement ground) in the setting sun. On this basis, the foregoing two histogram distribution patterns may be concluded. When either is satisfied, the image turns yellow under the influence of the setting sun. Accurate setting of the preset condition helps to accurately determine the saturation segmentation threshold later.

In one embodiment, the first peak is 1000, the second peak is 3000, the first hue value is 25°, the second hue value is 45°, and the preset pixel quantity is 100.

In a specific example, the preset condition A is as follows: the peak pixel quantity is greater than 1000, the hue value corresponding to the peak pixel quantity is less than 25°, the rightmost valid hue value on the horizontal axis is less than 45°, and the pixel quantity corresponding to zero hue is greater than 100; and the preset condition B is as follows: the peak pixel quantity is greater than 3000, the hue value corresponding to the peak pixel quantity is less than 25°, and the rightmost valid hue value on the horizontal axis is less than 45°.

The first peak, the second peak, the first hue value, the second hue value, and the preset pixel quantity may be selected according to an actual situation, and are excessively limited here.

In one embodiment, the first threshold range is 108-255, and the second threshold range is 38-255.

That is, the saturation segmentation threshold 108-255 is used for an image that turns yellow under the influence of the setting sun, and the saturation segmentation threshold 38-255 is used for an image in normal light. For the image in normal light, lawn regions and non-lawn regions in the image may be effectively segmented out by using the saturation segmentation threshold of 38-255. For the image that turns yellow under the influence of the setting sun, because the saturation of the lawn in the setting sun increases, lawn regions and non-lawn regions cannot be accurately segmented out by using the saturation segmentation threshold of 38-255. Therefore, the saturation segmentation threshold is adjusted to 108-255, and lawn regions and non-lawn regions can be effectively segmented out through the saturation segmentation threshold of 108-255.

The first threshold range and the second threshold range may also be adaptively adjusted according to the actual situation to adapt to the feature of the current image.

In one embodiment, step S800 of performing image segmentation in combination with the first threshold range or the second threshold range includes: segmenting lawn regions and non-lawn regions out from the HSV image in combination with the first threshold range or the second threshold range. That is, color segmentation is performed on the HSV image according to the saturation segmentation threshold, the hue segmentation threshold, and the value segmentation threshold, so as to segment lawn regions and non-lawn regions out.

The following describes the image segmentation method provided in this embodiment with reference to a specific example.

Figure 4:
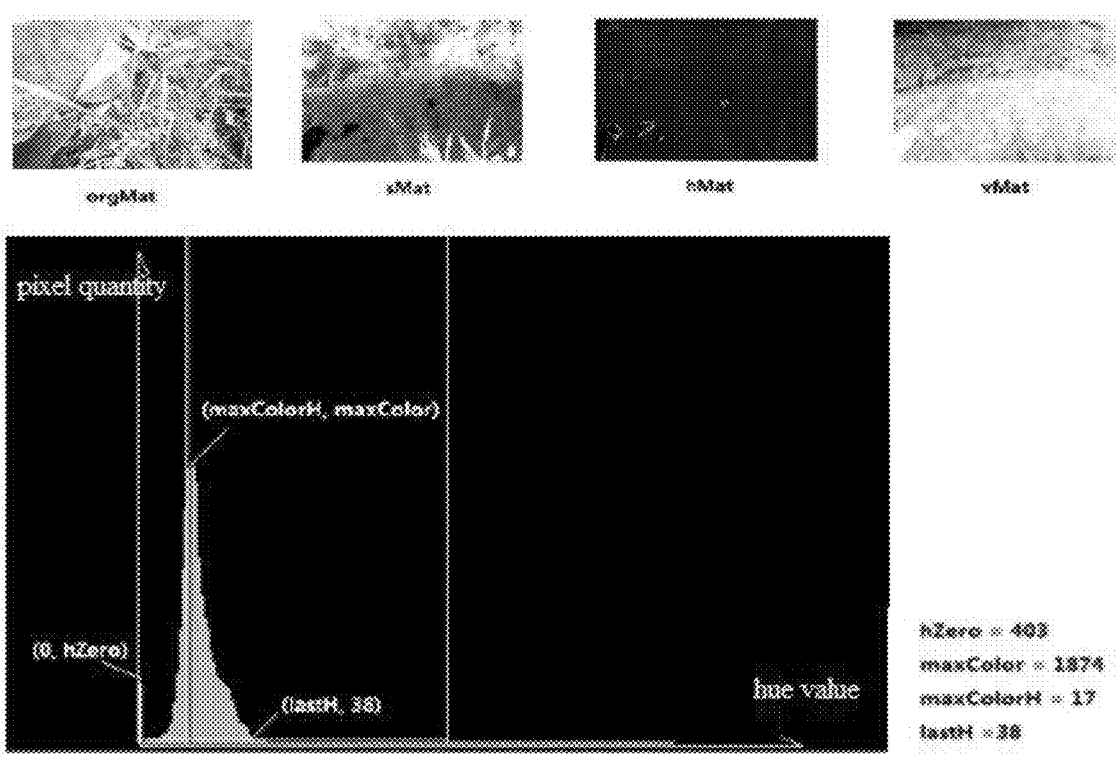
FIG. 4 is a schematic diagram showing an original image, three channel images based on the original image, and a derived hue histogram obtained in a specific example.

With reference to FIG. 4, an original image orgMat is first obtained and converted into an HSV image, and then a saturation channel image sMat, a hue channel image hMat, and a value channel image vMat are separated out.

A hue histogram is obtained according to the hue channel image hMat. From the hue histogram, it may be determined that a pixel quantity corresponding to zero hue is hZero=403, a peak pixel quantity is maxColor=1874, a hue value corresponding to the peak pixel quantity is maxColorH=17, and a rightmost valid hue value on the horizontal axis is lastH=38.

The preset condition A is as follows: maxColor>1000, maxColorH<25, lastH<45, and hZero>100; and the preset condition B is as follows: maxColor>3000, maxColorH<25, and lastH<45.

From the foregoing target parameter value and preset condition, it may be seen that the target parameter value satisfies the preset condition A, and the current image turns yellow under the influence of the setting sun. The saturation segmentation threshold [sLTH, sHTH] is set to [108, 255] (namely, the first threshold range).

Meanwhile, the hue segmentation threshold [hLTH, hHTH] is set to [15, 115], and the value segmentation threshold [vLTH, vHTH] is set to [10, 255]. The saturation segmentation threshold [sLTH, sHTH], the hue segmentation threshold [hLTH, hHTH], and the value segmentation threshold [vLTH, vHTH] are combined to perform color segmentation on the HSV image to obtain a target image prevObstacleMat, as shown in FIG. 5A. From the target image prevObstacleMat, it may be seen that the segmentation of lawn regions and non-lawn regions is relatively clear and accurate.

As a comparison, the saturation segmentation threshold [sLTH, sHTH] is set to [38, 255] (namely, the second threshold range), the hue segmentation threshold and the value segmentation threshold are unchanged, and finally a target image prevObstacleMat is obtained, as shown in FIG. 5B. From the target image prevObstacleMat, it may be seen that the segmentation of lawn regions and non-lawn regions is relatively blurry and has low accuracy.

It should be understood that although the steps in the flowchart involved in each foregoing embodiment are displayed sequentially as indicated by arrows, these steps are not necessarily executed sequentially in the order indicated by the arrows. Unless explicitly described herein, the execution of these steps is not limited to a strict order. Instead, the steps may be executed in other order. Moreover, at least some steps in the flowchart involved in each foregoing embodiment may include a plurality of steps or a plurality of stages. These steps or stages are not necessarily executed at the same time, but may be executed at different times. These steps or stages are not necessarily executed sequentially, but may be executed alternately with other steps or at least some of the steps or stages in the other steps.

Based on the same inventive concept, another embodiment of the present application further provides an image segmentation apparatus used to implement the foregoing image segmentation method. The implementation scheme provided by the image segmentation apparatus to solve the problems is similar to the implementation scheme described in the foregoing method. Therefore, specific definitions in one or more embodiments of the image segmentation apparatus provided below may refer to previous definitions on the image segmentation method, so details are not repeated here.

With reference to FIG. 6, the image segmentation apparatus provided in this embodiment includes an obtaining module 200, a first determination module 400, a second determination module 600, and an image segmentation module 800.

The obtaining module 200 is configured to obtain a hue histogram corresponding to a hue channel image based on an original image;

The first determination module 400 is configured to determine a target parameter value based on the hue histogram;

The second determination module 600 is configured to determine a saturation segmentation threshold as a first threshold range if the target parameter value satisfies a preset condition, otherwise determine the saturation segmentation threshold as a second threshold range, where a minimum value of the first threshold range is greater than a minimum value of the second threshold range; and The image segmentation module 800 is configured to perform image segmentation in combination with the first threshold range or the second threshold range.

According to the image segmentation apparatus provided in the embodiment of the present application, a hue histogram corresponding to a hue channel is obtained based on an original image, a target parameter value may be determined based on the hue histogram, then whether the target parameter value satisfies a preset condition is determined, and a saturation segmentation threshold is determined as a first threshold range if the target parameter value satisfies the preset condition, or the saturation segmentation threshold is determined as a second threshold range if the target parameter value does not satisfy the preset condition, where a minimum value of the first threshold range is greater than a minimum value of the second threshold range; and finally, image segmentation is performed in combination with the first threshold range or the second threshold range.

That is, captured images are not segmented by using a fixed saturation threshold range, but different saturation segmentation thresholds are used for different images to improve the clarity and accuracy of segmentation. Specifically, the preset condition and the saturation segmentation threshold may be set according to actual scenarios. For example, the preset condition and the saturation segmentation threshold may be set in advance according to the yellowing characteristics of images captured in the setting sun, and then whether the current image satisfies the preset condition is determined. If the current image satisfies the preset condition, it indicates that the current image is a yellowing image captured in the setting sun, and the first threshold range that matches the current image is used as the saturation segmentation threshold to segment the image. The minimum value of the first threshold range is greater than the minimum value of the second threshold range to adapt to the characteristic of high saturation of lawn regions in the setting sun. Consequently, the image can be clearly and accurately segmented for lawn and non-lawn, poor segmenting effects caused by image yellowing are avoided, and subsequent misjudgment is reduced.

In one embodiment, the obtaining module 200 includes a conversion unit and an obtaining unit.

The conversion unit is configured to convert the original image into an HSV image.

The obtaining unit is configured to separate the HSV image to obtain the hue channel image and the corresponding hue histogram.

In one embodiment, the image segmentation apparatus provided in this embodiment further includes a pre-processing module 300. The pre-processing module 300 is configured to pre-process the hue histogram, where the pre-processing includes filtering and smoothing.

In one embodiment, the target parameter value includes at least one of a peak pixel quantity, a hue value corresponding to the peak pixel quantity, a pixel quantity corresponding to zero hue, and a rightmost valid hue value on the horizontal axis.

In one embodiment, the preset condition includes any of the following:

Condition A: the peak pixel quantity is greater than a first peak, the hue value corresponding to the peak pixel quantity is less than a first hue value, the rightmost valid hue value on the horizontal axis is less than a second hue value, and the pixel quantity corresponding to zero hue is greater than a preset pixel quantity; and Condition B: the peak pixel quantity is greater than a second peak, the second peak is greater than the first peak, the hue value corresponding to the peak pixel quantity is less than the first hue value, and the rightmost valid hue value on the horizontal axis is less than the second hue value.

In one embodiment, the first peak is 1000, the second peak is 3000, the first hue value is 25°, the second hue value is 45°, and the preset pixel quantity is 100.

In one embodiment, the first threshold range is 108-255, and the second threshold range is 38-255.

In one embodiment, the image segmentation module 800 is configured to segment lawn regions and non-lawn regions out from the HSV image in combination with the first threshold range and the second threshold range The modules in the image segmentation apparatus may be implemented in whole or in part by software, hardware, and a combination thereof. The modules may be embedded in or independent of a processor in a computer device in the form of hardware, or stored in a memory of the computer device in the form of software, so that the processor invokes the operations corresponding to the modules.

In one embodiment, a computer device is provided, including a memory and a processor. The memory stores a computer program, and the processor implements the steps of the foregoing method embodiments when executing the computer program.

Figure 7:
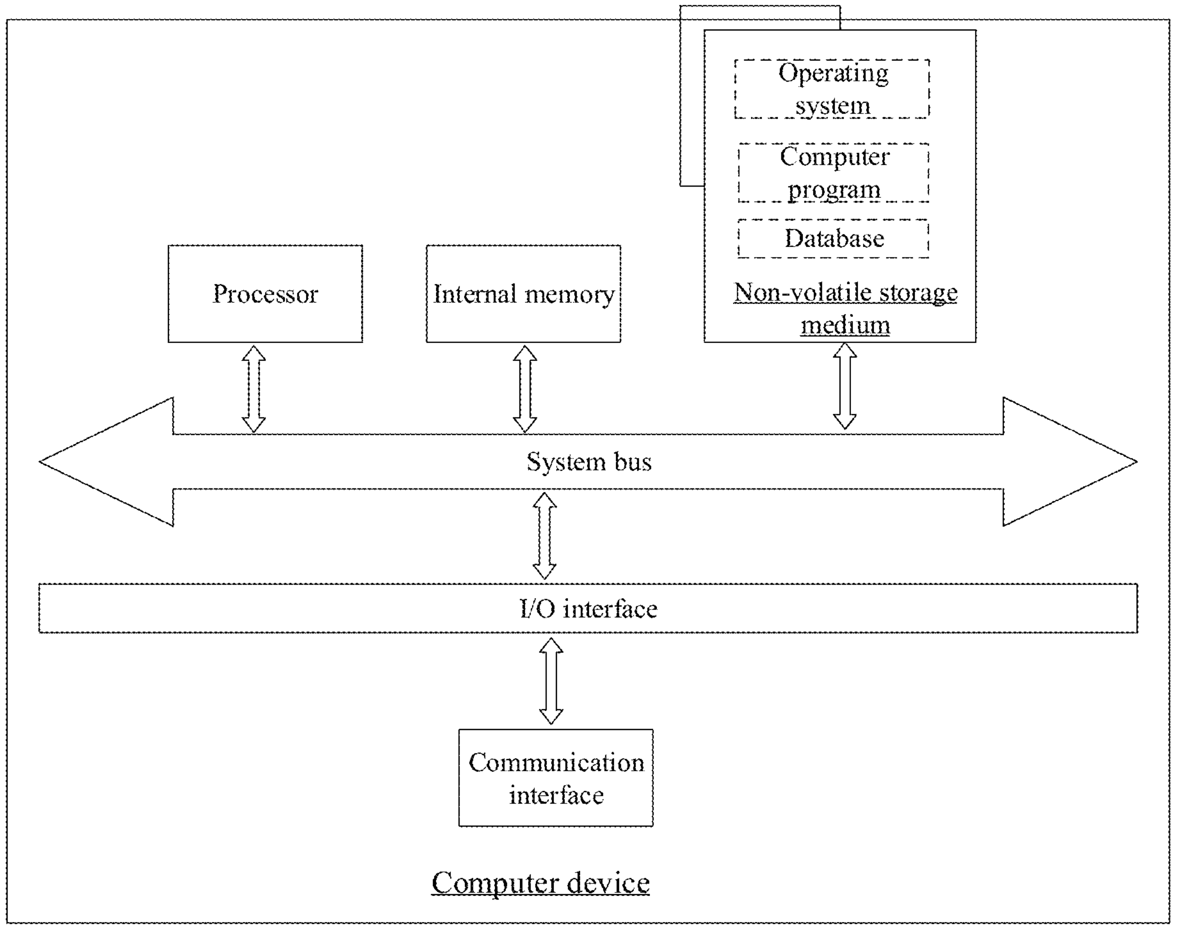
FIG. 7 is a schematic structural diagram of a computer device provided in an embodiment of the present application.

FIG. 7 is a schematic structural diagram of a computer device provided in an embodiment of the present application. The computer device may be a server, and its internal structure may be shown in FIG. 7. The computer device includes a processor, a memory, and a network interface that are connected by a system bus. The processor of the computer device is used to provide computing and control capabilities. The memory of the computer device includes a non-volatile storage medium and an internal memory. The non-volatile storage medium stores an operating system, a computer program and a database. The internal memory provides an environment for the operation of the operating system and the computer program in the non-volatile storage medium. The database of the computer device is used to store various data involved in the image segmentation method. The network interface of the computer device is used to communicate with an external terminal through a network connection. The computer program is executed by the processor to implement an image segmentation method.

Those skilled in the art can understand that the structure shown in FIG. 7 is only a block diagram of a partial structure related to the solution of the present application, and does not constitute a limitation on the computer device to which the solution of the present application is applied. The specific computer device may include more or fewer parts than shown in the figure, or combine some parts, or have a different arrangement of parts.

In one embodiment, a computer-readable storage medium is provided, storing a computer program. When the computer program is executed by a processor, the steps of the foregoing method embodiments are implemented.

A person of ordinary skill in the art may understand that all or part of the processes in the methods of the foregoing embodiments may be implemented by a computer program instructing relevant hardware. The computer program may be stored in a non-volatile computer-readable storage medium. The computer program, when executed, may include the processes of the embodiments of the above methods. Any reference to the memory, storage, database or other media used in the embodiments provided by the present application may include at least one of non-volatile and volatile memories. The non-volatile memory may include a read-only memory (ROM), a magnetic tape, a floppy disk, a flash memory, or an optical memory. The volatile memory may include a random access memory (RAM) or an external cache memory. As an illustration and not a limitation, the RAM may be in various forms, such as a static random access memory (SRAM) or a dynamic random access memory (DRAM).

The technical features of the foregoing embodiments may be combined arbitrarily. For the purpose of simplicity in description, all possible combinations of the technical features in the foregoing embodiments are not described. However, as long as the combinations of these technical features do not have contradictions, they should be considered to fall within the scope of this specification.

The foregoing embodiments only describe several implementations of the present application, and their descriptions are specific and detailed, but cannot therefore be understood as limitations to the patent scope. It should be noted that those of ordinary skill in the art may further make variations and improvements without departing from the conception of the present application, and these all fall within the protection scope of the present application. Therefore, the protection scope of the present application should be subject to the appended claims.

The invention claimed is:

1. An image segmentation method, comprising the steps of:

converting an original image into an HSV image;

separating the HSV image channels to obtain a hue channel image;

obtaining a hue histogram corresponding to the hue channel image, wherein the hue histogram has hue value as its horizontal axis and pixel quantity as its vertical axis, and pre-processing the hue histogram by filtering and smoothing;

determining a target parameter value based on the hue histogram, wherein the target parameter value comprises at least one of: a peak pixel quantity, wherein the peak pixel quantity is a maximum value of the pixel quantity in the hue histogram; the hue value corresponding to the peak pixel quantity, a pixel quantity corresponding to zero hue, and a rightmost valid he value on the horizontal axis of the hue histogram, wherein the rightmost valid hue value is the hue value corresponding to the point where the quantity of pixel points is first greater than a preset pixel quantity in a direction from right to left on the horizontal axis;

determining a saturation segmentation threshold as a first threshold range if the target parameter value satisfies a preset condition, otherwise determining the saturation segmentation threshold as a second threshold range, where a minimum value of the first threshold range is greater than a minimum value of the second threshold range, wherein the preset condition comprises one of conditions A and B:

condition A: the peak pixel quantity is greater than a first peak pixel quantity, the hue value corresponding the peak pixel quantity is less than a first hue value, the rightmost valid hue value on the horizontal axis is less than a second hue value, and the pixel quantity corresponding to zero hue is greater than a preset pixel quantity; and condition B: the peak pixel quantity is greater than a second peak pixel quantity, the second peak is greater than the first peak, the hue value corresponding to the peak pixel quantity is less than the first hue vale, and the rightmost valid hue value on the horizontal axis is less than the second hue value; and performing image segmentation using the first threshold range or the second threshold range, respectively as determined in the previous step.

2. The image segmentation method according to claim 1, wherein the first peak pixel quantity is 1000, the second peak pixel quantity is 3000, the first hue value is 25°, the second hue value is 45°, and the preset pixel quantity is 100.

3. The image segmentation method according to claim 1, wherein the first threshold range is 108-255, and the second threshold range is 38-255.

4. The image segmentation method according to claim 1, wherein the step of performing image segmentation using the first threshold range or the second threshold range comprises:

segmenting lawn regions and non-lawn regions out from the HSV image the first threshold range or the second threshold range respectively.

5. An image segmentation apparatus comprising:

an obtaining module comprising a conversion unit and an obtaining unit, wherein the conversion unit is configured to convert an original image into an HSV image and the obtaining unit is configured to separate the HSV image to obtain a hue channel image and a corresponding hue histogram has hue value as its horizontal axis and pixel quantity as its vertical axis, and to pre-process the hue histogram by filtering and smoothing;

a first determination module configured to determine a target parameter value based on the hue histogram, wherein the target parameter value comprises at least one of: a peak pixel quantity, wherein the peak pixel quantity is the maximum value of the pixel quantity in the hue histogram; the hue value corresponding to the peak pixel quantity, a pixel quantity corresponding to zero hue, and a rightmost valid hue value on the horizontal axis of the hue histogram, wherein the rightmost valid hue value is the hue value corresponding to the point where the quantity of pixel points is first greater than a preset pixel quantity in a direction from right to let on the horizontal axis;

a second determination module configured to determine a saturation segmentation threshold as a first threshold range if the target parameter value satisfies a preset condition, otherwise to determine the saturation segmentation threshold as a second threshold range, where a minimum value of the first threshold range is greater than a minimum value of the second threshold range, wherein the preset condition comprises one of conditions A and B:

condition A: the peak pixel quantity is greater than a first peak pixel quantity, the hue value corresponding to the peak pixel quantity is less than a first hue value, the rightmost valid hue value on the horizontal axis is less than a second hue value, and the pixel quantity corresponding to zero hue is greater than a preset pixel quantity; and condition B: the peak pixel quantity is greater than a second peak pixel quantity, the second peak is greater than the first peak, the hue value corresponding to the peak pixel quantity is less than the first hue value, and the rightmost valid hue value on the horizontal axis is less than the second hue value; and an image segmentation module configured to perform image segmentation using the first threshold range or the second threshold range, respectively determined by the second determination module.

6. A computer device comprising a memory and a processor, the memory storing a computer program, wherein the processor implements the image segmentation method according to claim 1 when executing the computer program.

7. A computer-readable storage medium, storing a computer program, wherein the image segmentation method according to claim 1 is implemented when the computer program is executed by a processor.

* * * * *